(12) United States Patent
Heying (10) Patent No.: US 8,970,389 B2
(45) Date of Patent: Mar. 3, 2015

(54) STIR ALARM

(76) Inventor: Randy Heying, Alton, IA (US)

( * ) Notice: Subject to any disclaimer, the term of this patent is extended or adjusted under 35 U.S.C. 154(b) by 199 days.

(21) Appl. No.: 13/593,630

(22) Filed: Aug. 24, 2012

(65) Prior Publication Data

US 2013/0049975 A1 Feb. 28, 2013

Related U.S. Application Data

(60) Provisional application No. 61/527,467, filed on Aug. 25, 2011.

(51) Int. Cl.
| | | |
|---|---|---|
| *G08B 21/00* | (2006.01) |
| *B01F 7/30* | (2006.01) |
| *A01F 25/22* | (2006.01) |
| *B01F 7/00* | (2006.01) |
| *G01P 13/00* | (2006.01) |

(52) U.S. Cl.
CPC ............... *B01F 7/302* (2013.01); *A01F 25/22* (2013.01); *B01F 7/00416* (2013.01); *B01F 7/00975* (2013.01); *G01P 13/0006* (2013.01); *B01F 2215/0013* (2013.01)
USPC ........ 340/684; 340/679; 340/680; 340/686.1; 110/186

(58) Field of Classification Search
USPC ............. 340/670, 679, 680, 684, 685, 686.1; 110/341, 165 A, 233, 297, 186; 241/36
See application file for complete search history.

(56) References Cited

U.S. PATENT DOCUMENTS

| 7,621,227 | B2* | 11/2009 | Sterr ............................. 110/297 |
| 7,833,560 | B2* | 11/2010 | Velissariou et al. ........... 426/590 |
| 2002/0189807 | A1* | 12/2002 | Emanuele et al. ............. 166/266 |
| 2007/0026910 | A1* | 2/2007 | Brome et al. ..................... 460/6 |
| 2007/0137538 | A1* | 6/2007 | Sterr ............................. 110/341 |
| 2007/0290084 | A1* | 12/2007 | Ootsuka et al. ................. 241/36 |
| 2008/0078587 | A1* | 4/2008 | Johansen et al. .............. 177/136 |
| 2009/0199747 | A1* | 8/2009 | Laskowski et al. ........... 110/186 |
| 2012/0032444 | A1* | 2/2012 | Burton ............................ 290/53 |
| 2012/0305549 | A1* | 12/2012 | Wylie ............................ 219/726 |
| 2013/0017535 | A1* | 1/2013 | Frey et al. ......................... 435/5 |
| 2013/0049975 | A1* | 2/2013 | Heying ........................... 340/670 |

* cited by examiner

*Primary Examiner* — Hoi Lau
(74) *Attorney, Agent, or Firm* — Husch Blackwell LLP

(57) ABSTRACT

A stir alarm device for monitoring a forced air in-bin grain stirring system and alerting an individual when the stirring system malfunctions. The stir alarm device may include a movement device which is movably secured to the stirring system, such that movement of the stirring system causes movement of the movement device. The stir alarm device may further include a detection mechanism for monitoring the movement of the movement device. The stir alarm may also include a signaling device operably attached to the detection mechanism, the signaling device for signaling a malfunction when an amount of movement detected by the movement detection mechanism is below a threshold for a predetermined period of time and may include methods or components to control the operation of the stir machine and/or drying system.

14 Claims, 8 Drawing Sheets

STIR ALARM

CROSS-REFERENCE TO RELATED APPLICATION

The present application claims priority to and incorporates herein by reference U.S. Provisional Patent Application Ser. No. 61/527,467 filed on Aug. 25, 2011.

BACKGROUND OF THE INVENTION

The present invention relates generally to grain storage and, more particularly, to a stir alarm device for integration with an in-bin grain stirring system, which is designed to monitor and alert an individual when the stirring system malfunctions.

Grain bins are typically designed to process and store grains of all types. Oftentimes, grain bins include a drying system for heating and blowing air, which forces the heated air up through perforations located in the base of the bin so that it may contact the grain contained therein, such that the grain closest to the floor dries first. The grain is dried using either the "continuous flow method" or the "batch method". The "continuous flow method" is a process of drying grain where sufficiently dried grain is continuously removed from the floor area of the bin as wet grain in added to the top of the bin. The "batch method" is a process of drying grain where the bin is partially or completely filled with wet grain and then the grain is stirred until all of the grain within the bin is sufficiently dried. When the "batch method" is employed, a stirring system is usually installed within each grain bin for mixing the grain in order to facilitate even drying. A typical stirring system includes an auger carriage which is suspended from the center of the bin's roof and a track which is mounted on the inside of the bin wall, the track being designed for receiving the auger carriage and allowing it to move along the bin's inner perimeter. This rotational movement is commonly referred to as "walking." The auger carriage typically includes a plurality of vertical rotating augers, which the auger carriage pulls through the grain to mix it and to encourage even drying. As the augers turn, the rotation of the augers also assists the auger in walking through the grain. The speed of the auger carriage is controlled by a gear motor which is controlled by a tilt switch. If the auger carriage gets too far ahead of the augers, the augers tilt enough to actuate the tilt switch, which disengages the gear motor from driving the auger carriage to let the augers catch up. Depending on the level of moisture the grain contains and the volume of the grain, it can take between approximately 3 to 6 days (and sometimes longer) for the grain to reach a sufficiently dry state.

Because a typical stirring system contains a number of component parts, any stirring system that is installed in a grain bin will experience periodic mechanical malfunctions. Furthermore, because the stirring system operates independently from the drying system, if the stirring system malfunctions, the grain directly above the drying system and in the proximity of the vertical augers will continue to dry beyond what is intended, while the rest of the grain in the bin remains wet. Thus, if the malfunction of the stirring system is not quickly detected and repaired, irreparable damage can occur to the stir machine as well as uneven and overdrying of grain and overgrinding of grain by the augers, resulting in lost time and money. At present, the only way to ensure even drying is for an individual to climb to the top of a ladder located on the side of the grain bin, open a door in the roof and watch for several minutes to confirm that the stirring system is operating correctly. Each bin must be checked numerous times every day (and night) throughout the drying process in order to prevent the grain from being unevenly dried and damaged in the stall zone. In addition to being time consuming and inconvenient, this practice of checking bins adds considerable stress during the harvest season.

Thus, it would be advantageous to develop a stir alarm device which is designed to monitor the stirring system and alert an individual when a malfunction occurs.

SUMMARY OF THE INVENTION

The present invention is directed to a stir alarm device which is designed for monitoring and alerting an individual when the stirring system installed within a grain bin malfunctions. A typical prior art grain bin includes a stirring system for mixing the grain within the bin to ensure that the heated air created by the drying system evenly dries the grain. Specifically, the stirring system is operably secured to the center of the bin's roof by a suspension mechanism, creating an axis on which the stirring system rotates. The stirring system further includes an auger carriage which extends outwardly from the axis point and is movably secured to a track located on the inside wall of the bin. The track is designed to receive the auger carriage, allowing it to rotate within the grain bin. The auger carriage further includes a rotary contact providing voltage to components, and a plurality of revolving augers which may be evenly spaced across the length of the auger carriage. As the auger carriage rotates around the grain bin it pulls each of the augers through the grain, facilitating mixing and even drying.

The stir alarm device is operably attached to the stirring system and is designed for monitoring and alerting an individual when malfunctions occur. The device includes a movement device coupled to an existing stirring system, such that movement of the stirring system causes movement of the movement device. The movement device may be a carousel that revolves around a central axis thereof, or a trolley which rides along the track around the inner circumference of the bin as the auger carriage moves therealong. The stir alarm device may also include a detection mechanism for monitoring the movement of the movement device, and a signaling device for signaling a malfunction when an amount of movement detected by the movement detection mechanism is below a threshold for a predetermined period of time. The device may also include a microprocessor for receiving and monitoring information collected by the device and for alerting the individual if a malfunction occurs.

Specific advantages and features of the present assembly will be apparent from the accompanying drawings and the description of several illustrative embodiments of the present invention.

It should be understood that the present drawings are not necessarily to scale and that the embodiments disclosed herein are sometimes illustrated by fragmentary views. In certain instances, details which are not necessary for an understanding of the present invention or which render other details difficult to perceive may have been omitted. It should also be understood that the invention is not necessarily limited to the particular embodiments illustrated herein. Like numbers utilized throughout the various figures designate like or similar parts or structure.

DETAILED DESCRIPTION

Figures 1A, 1B:
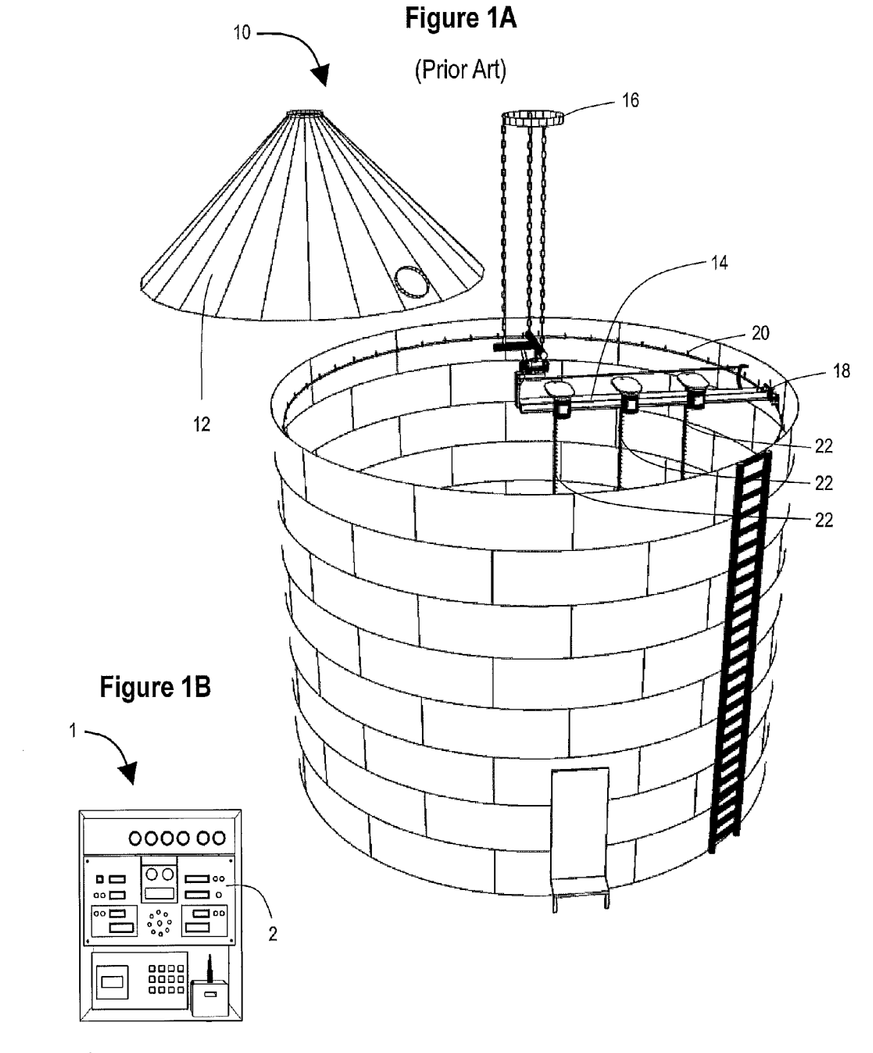
FIG. 1A illustrates an environmental view of a prior art grain bin with the roof removed to show a stirring system housed within.
FIG. 1B illustrates an exemplary control box according to an embodiment of the present invention.

Referring now to the drawings, more particularly by reference numbers, FIG. 1A illustrates one embodiment of a typical prior art grain bin 10 with a roof 12, shown removed so as to expose one embodiment of a typical stirring system 14 installed within the grain bin 10. The grain bin 10 typically includes a drying system (not shown) for heating and blowing air, which forces the heated air up through perforations located in the base of the grain bin 10 so that it may contact the grain contained therein. The stirring system 14 may be operably secured to the center of the roof 12 by a suspension mechanism 16, creating an axis about which an auger carriage 18 rotates. The auger carriage 18 extends outward from the axis point as a radius of the grain bin 10, and is movably secured to a track 20 which extends around the inner circumference of bin 10. The track 20 is designed for guiding the auger carriage 18 and allowing it to move along the inner perimeter of the grain bin 10. The rotational movement of the auger carriage 18 is commonly referred to as "walking." The auger carriage 18 further includes a plurality of revolving augers 22 which may be evenly spaced across the length of the auger carriage 18. As the auger carriage 18 walks around the grain bin 10 it pulls each of the revolving augers 22 through the grain, facilitating mixing and even drying.

FIG. 1B illustrates an exemplary control box 1 for housing a controller 2. Controller 2 is designed to receive and analyze signals regarding movement of the stirring system 14. Controller 2 may initiate a malfunction alarm, and/or shut down the stirring system 14 and dryer (not shown).

As can be seen in FIGS. 2A, 2B, 3 and 4, a stir alarm device 26 may include a carousel 32 which is operably attached to the proximate end of the auger carriage 18 (or other rotating component, preferably located at the axis point) by a bracket 30. Rotational movement of the auger carriage 18 thereby causes the carousel 32 to revolve around the central axis. The device 26 further includes a movement detection mechanism 34 which is secured to a stationary portion of the suspension mechanism 16 by a bracket 28. The detection mechanism 34 is positioned for monitoring the movement of the carousel 32 and configured to transmit a signal to a signaling device communicatively associated with a controller (as would be understood). In one embodiment, the detection mechanism may be connected to a wireless transceiver for transmitting a signal to a controller (not shown). Alternatively, the detection mechanism may be hardwired with such a controller. The controller may be responsible for analyzing the information received from the detection mechanism 34, and for determining whether to take action. The controller may alert the user of a malfunction by sending a text and/or email message and/or making a telephone call to the user, and/or by causing a visual and/or auditory warning to commence, according to known systems and methods.

Figure 2A:
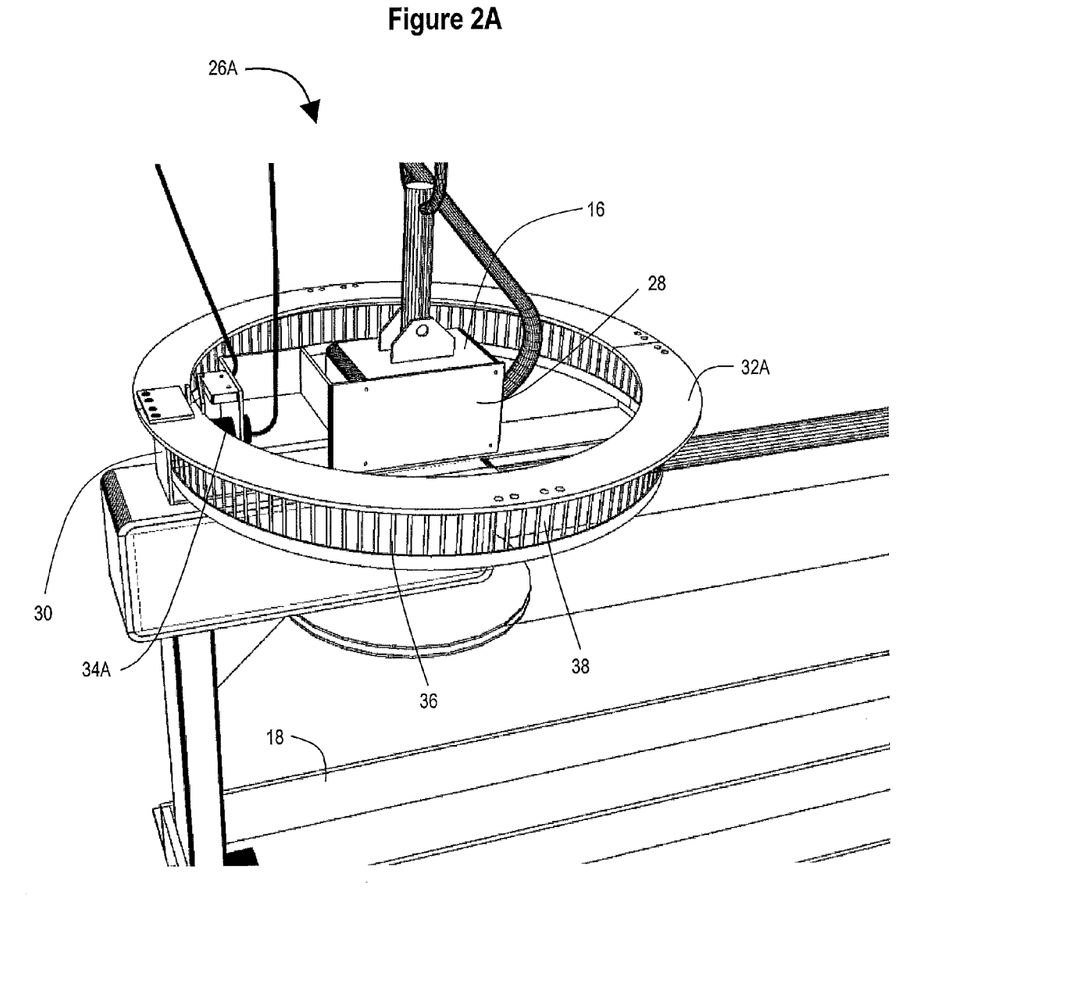
FIG. 2A is a perspective view of one embodiment of a stir alarm device incorporating a carousel, according to an embodiment of the present invention.
Figure 2B:
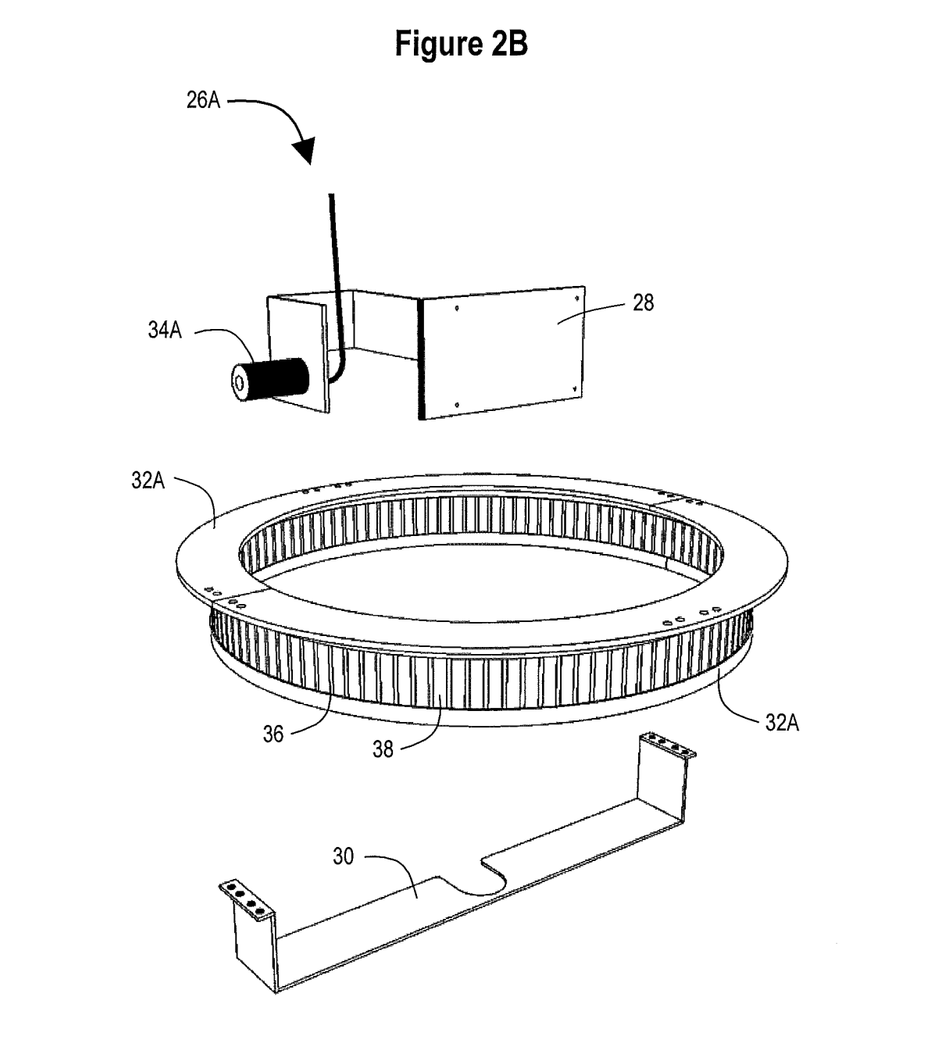
FIG. 2B is an exploded view of the stir alarm device of FIG. 2A.

FIGS. 2A and 2B illustrate one carousel-specific embodiment of the device 26A. In this embodiment, the detection mechanism 34A is a proximity sensor designed to detect the presence of metal. The carousel 32A may have a plurality of evenly spaced metal slats 36, such that the spaces between the slats 36 form a plurality of slits 38. The detection mechanism 34A serves to detect transitions between the metal slats 36 and slits 38, and to transmit a signal to the controller.

Figure 3:
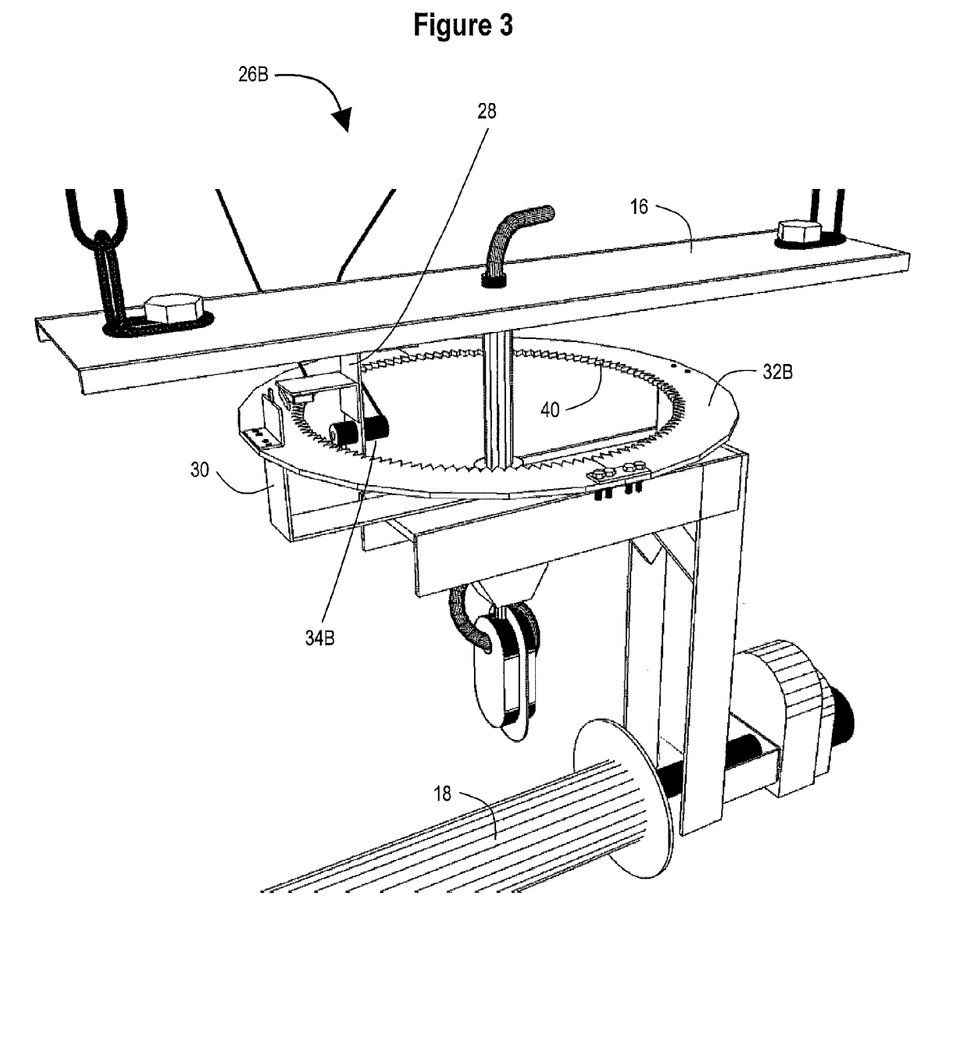
FIG. 3 is a perspective view of another embodiment of a stir alarm device which incorporates a carousel, according to an embodiment of the present invention.

In an alternative carousel-specific embodiment, as illustrated in FIG. 3, the device 26B includes a carousel 32B having a plurality of metal teeth 40. In this embodiment, the detection mechanism 34B is a proximity sensor designed to detect the presence of metal. The detection mechanism 34B serves to detect transitions between each tooth projection and each recess, and to transmit a signal to the controller. Even after repeated use, these embodiments remain reliable, since the detection mechanism 34A, 34B is a proximity sensor capable of detecting metal through any dust and/or particulate matter that may collect on the carousel 32A, 32B.

Figure 4:
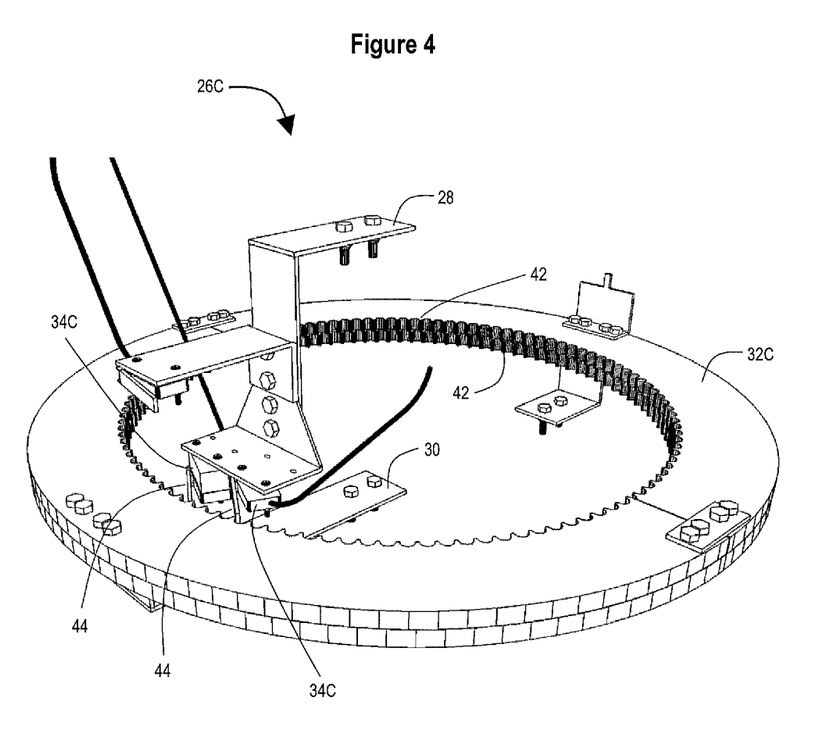
FIG. 4 is a perspective view of one embodiment of a stir alarm device which incorporates a carousel, according to an embodiment of the present invention.

In still another carousel-specific embodiment, as illustrated in FIG. 4, the device 26C includes a carousel 32C having a plurality of geared teeth 42. The device 26C further including a detection mechanism 34C which is secured to a stationary portion of the suspension mechanism 16. The movement detection mechanism 34C is positioned for monitoring the movement of the carousel 32C. In this embodiment, as the carousel 32C moves, the projection of a geared tooth 42 engages a lever 44 which is operably connected to the detection mechanism 34C. Movement of the carousel 32C causes the geared tooth 42 to interact with and actuate the lever 44, thereby allowing the movement detection mechanism 34C to detect movement of the carousel 32C via the lever 44. Each time a tooth 42 passes the lever 44, the transition from a recess to a tooth 42 (or vice versa) causes the lever 44 to be actuated, and a transition is recorded. The detection mechanism 34C is designed to transmit a signal to the controller. As shown in FIG. 4, the carousel 32C includes two rows of such teeth 42 which are slightly offset from each other, though this is not required. Additional, offset rows of teeth simply provide for more transitions in a given period of time.

Figure 5:
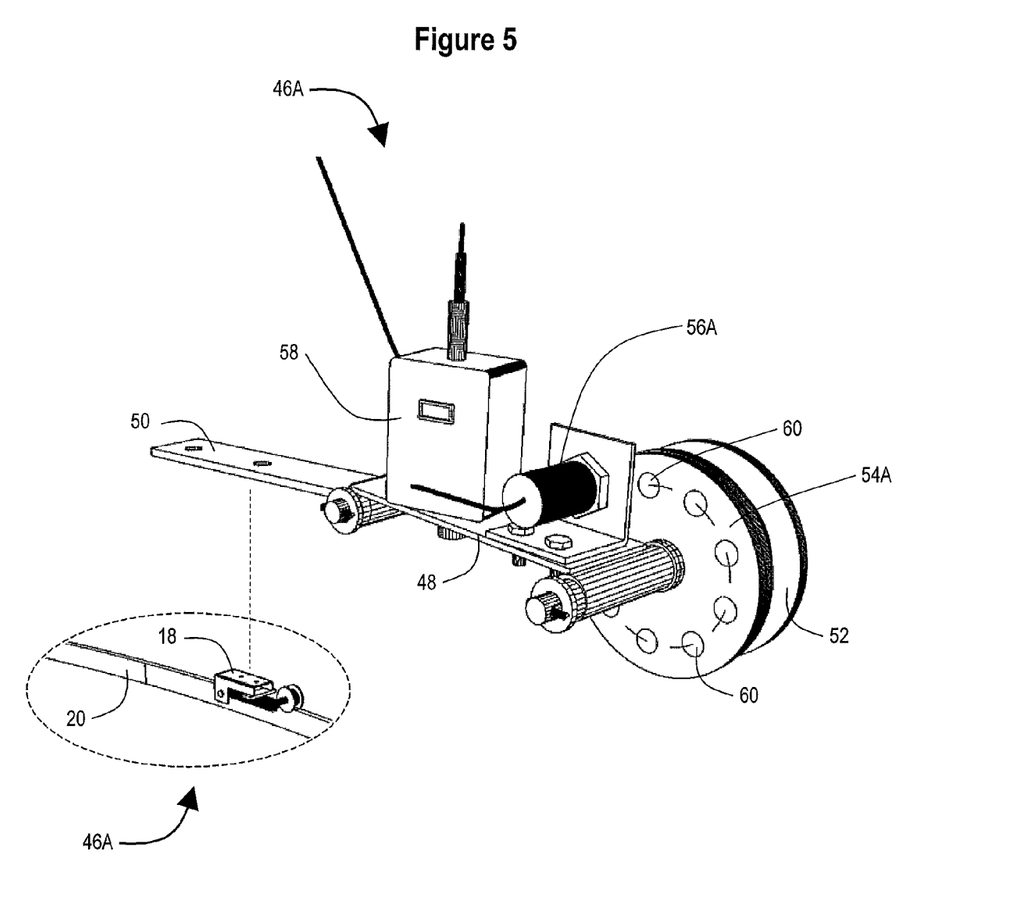
FIG. 5 is a perspective view of one embodiment of a stir alarm device which incorporates a trolley as connected to an auger carriage, with a zoomed-in section focusing on the stir alarm device, according to an embodiment of the present invention.
Figure 6:
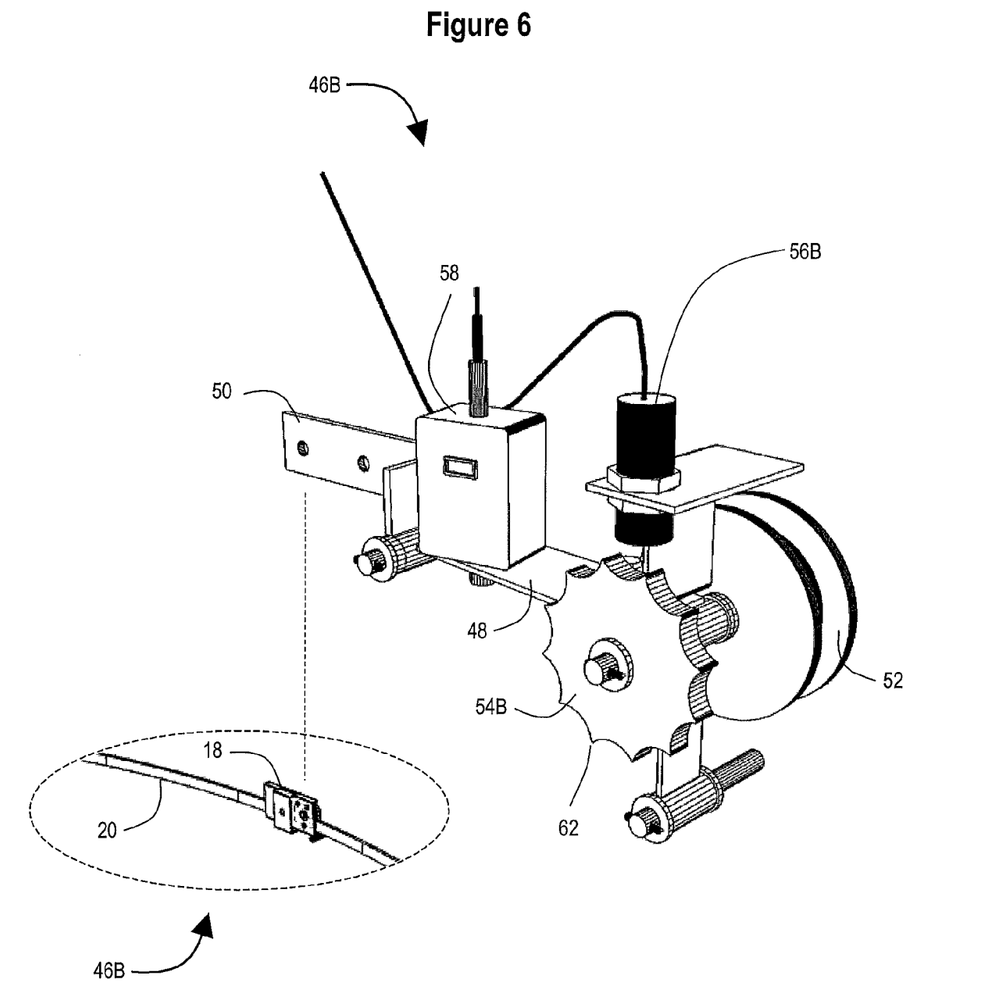
FIG. 6 is a perspective view of one embodiment of a stir alarm device which incorporates a trolley as connected to an auger carriage, with a zoomed-in section focusing on the stir alarm device, according to an embodiment of the present invention.
Figure 7:
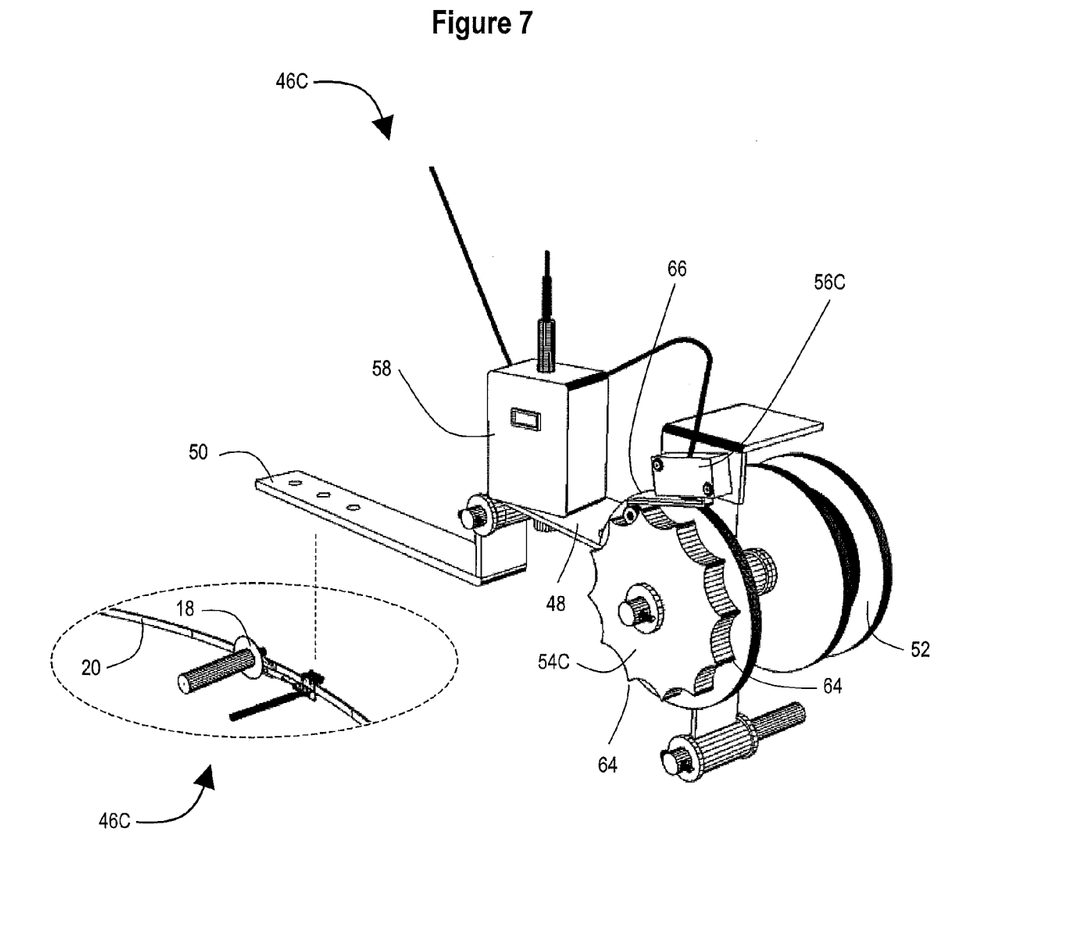
FIG. 7 is a perspective view of one embodiment of a stir alarm device which incorporates a trolley as connected to an auger carriage, with a zoomed-in section focusing on the stir alarm device, according to an embodiment of the present invention.

In an alternative embodiment as shown in FIGS. 5, 6 and 7, the device 46 includes a trolley 48 which travels along track 20, and is coupled to the auger carriage 18 by a bracket 50. Further, the trolley 48 is movably engagable with the track 20 by a roller 52. In one embodiment the device 46 is pulled behind the auger carriage 18 as it walks around the grain bin 10. Associated with the roller 52 is a wheel 54 (which may be integral with or a part of roller 52) which revolves as the trolley 48 moves around the track 20. The device 46 further includes a detection mechanism 56, which is secured to the trolley 48. The detection mechanism 56 is preferably positioned for monitoring the movement of the wheel 54, and is configured to communicate through the signaling device 58 for transmitting a signal to the controller. In an alternative embodiment, rather than use a wireless signaling device, the detection mechanism 56 may be hardwired to the controller through a rotary contact.

FIG. 5 illustrates one embodiment of such a trolley-type device 46A. In this embodiment, the detection mechanism 56A is a magnetic sensor designed to detect a magnetic field created. The wheel 54A may have a plurality of magnetic discs 60 or magnetic wrap, evenly spaced around the perimeter thereof. The detection mechanism 56A serves to detect transitions between the each of the magnetic discs 60 and the spaces therebetween.

FIG. 6 illustrates yet another embodiment of the device 46B. In this embodiment, the device 46B includes a wheel 54B having a plurality of metal teeth 62. In this embodiment, the detection mechanism 56B is a proximity sensor designed to detect the presence of metal. The detection mechanism 56B serves to detect transitions between each tooth projection and recess. The detection mechanism 56B communicates with signaling device 58 for transmitting a signal to the controller. In an alternative embodiment, rather than use a wireless signaling device, the detection mechanism 56B may be hardwired to the controller through a rotary contact.

In still another embodiment, as illustrated in FIG. 7, the device 46C includes a wheel 54C having a plurality of geared teeth 64. The device 46C further includes a detection mechanism 56C which is positioned for monitoring the movement of the wheel 54C. In this embodiment, as the wheel 54C moves, each geared tooth 64 engages a lever 66 which is operably connected to the detection mechanism 56C. Each time a tooth 64 passes the lever 66, the transition from a recess to a tooth 64 (or vice versa) causes the lever 66 to be actuated, and a transition is recorded. The detection mechanism 56C is designed to transmit a signal to the controller. In an alternative embodiment, rather than use a wireless signaling device, the detection mechanism 56C may be hardwired to the controller through a rotary contact.

A user may set the number of desired transitions and the predetermined period of time, as desired. Additionally, the stir alarm device 26, 46 will physically pause if the auger carriage 18 is intentionally paused to allow the augers 22 to catch up. The predetermined period of time may be set high enough to take into account any standard pause time for the auger carriage 18.

The stir alarm device 26, 46 may also be used to track the position of the auger carriage 18 around the bin 10. This may be accomplished by tracking the number of transitions counted by the detection mechanism 34, 56, and using that number to determine the distance traveled by the trolley 48 or carousel 32. A "home" condition may be initiated each time the trolley 48 or carousel 32 complete one entire revolution, such that the number of transitions is reset (if only for the purposes of determining the location of the auger carriage 18 within the bin 10). In this manner, the number of transitions since the home condition could be used to determine the location of the auger carriage 18 within the bin 10. Alternatively, a physical switch could be installed at the home position which would be physically actuated by the trolley 48 as it passes, or by another lever on a carousel 32, to initiate the home condition. Physical switches or other activation devices may also be installed around the bin 10 interior wall or track mounting brackets to determine the location of the auger carriage 18.

Thus, there has been shown and described an embodiment of a novel stir alarm device. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A stir alarm device for monitoring the movement of a stirring system,
   the stir alarm device comprising:
   a carousel secured to the stirring system such that movement of the stirring system causes movement of the carousel;
   a movement detection mechanism for monitoring the movement of the carousel;
   a controller communicatively attached to the detection mechanism, the controller for detecting and signaling a malfunction when an amount of movement detected is below a threshold for a predetermined period of time.

2. The stir alarm device of claim 1 wherein the movement detection mechanism is a proximity sensor.

3. The stir alarm device of claim 2 wherein the carousel further includes a plurality of metal slats with slits positioned therebetween.

4. The stir alarm device of claim 2 wherein the carousel further includes a plurality of metal teeth.

5. The stir alarm device of claim 1 wherein the detection mechanism further includes a lever for engaging the carousel.

6. The stir alarm device of claim 5 wherein the carousel further includes a plurality of geared teeth, such that movement of the carousel causes the geared teeth to interact with and actuate the lever, thereby allowing the detection mechanism to detect movement of the carousel via the lever.

7. A stir alarm device for monitoring the movement of a stirring system
   along a track, the stir alarm device comprising:
   a trolley for operably securing the device to the stirring system and to the track, such that movement of the stirring system along the track causes movement of the trolley along the track;
   a wheel positioned on the trolley, where movement of the trolley causes rotation of the wheel;
   a movement detection mechanism secured to the trolley for monitoring the movement of the wheel;
   a controller communicatively attached to the detection mechanism, the controller for detecting and signaling a malfunction when an amount of movement detected is below a threshold for a predetermined period of time.

8. The stir alarm device of claim 7 wherein the detection mechanism is a proximity sensor.

9. The stir alarm device of claim 8 wherein the wheel further includes a plurality of magnetic elements.

10. The stir alarm device of claim 7 wherein the detection mechanism is a proximity sensor for detecting metal.

11. The stir alarm device of claim 10 wherein the wheel further includes a plurality of metal teeth.

12. The stir alarm device of claim 7 wherein the detection mechanism further includes a lever for engaging the wheel.

13. The stir alarm device of claim 12 wherein the wheel further includes a plurality of geared teeth such that revolution of the wheel causes the geared teeth to interact with and actuate the lever, thereby allowing the movement detection mechanism to detect movement of the wheel via the lever.

14. A stir alarm device for monitoring the movement of a stirring system, the stir alarm device comprising:
- a movement device coupled to the stirring system such that movement of the stirring system causes movement of the movement device;
- a movement detection mechanism for monitoring the movement of the movement device; and
- a controller communicatively attached to the detection mechanism, the controller for detecting and signaling a malfunction when an amount of movement detected is below a threshold for a predetermined period of time; wherein the movement device is a carousel.

* * * * *